(12) United States Patent
Xiong et al.

(10) Patent No.: US 12,203,556 B2
(45) Date of Patent: Jan. 21, 2025

(54) ONE-WAY VALVE

(71) Applicant: ZHEJIANG DUNAN ARTIFICIAL ENVIRONMENT CO., LTD., Shaoxing (CN)

(72) Inventors: Yunjun Xiong, Shaoxing (CN); Zhou Yu, Shaoxing (CN); Zhijun Kang, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 55 days.

(21) Appl. No.: 18/137,463

(22) Filed: Apr. 21, 2023

(65) Prior Publication Data

US 2023/0265935 A1    Aug. 24, 2023

Related U.S. Application Data

(63) Continuation of application No. PCT/CN2021/124923, filed on Oct. 20, 2021.

(30) Foreign Application Priority Data

| Oct. 21, 2020 | (CN) | ......................... 202022365163.3 |
| Oct. 21, 2020 | (CN) | ......................... 202022365645.9 |
| Oct. 21, 2020 | (CN) | ......................... 202022365716.5 |

(51) Int. Cl.
*F16K 27/02* (2006.01)
*F16K 15/02* (2006.01)

(52) U.S. Cl.
CPC ........ *F16K 27/0209* (2013.01); *F16K 15/028* (2013.01)

(58) Field of Classification Search
CPC .... F16K 15/021; F16K 15/023; F16K 15/026; F16K 15/028; F16K 15/063; F16K 27/0209
See application file for complete search history.

(56) References Cited

U.S. PATENT DOCUMENTS

| 3,548,870 A | 12/1970 | Morton et al. |
| 2018/0119840 A1* | 5/2018 | Hishiya ................. F16K 27/102 |

FOREIGN PATENT DOCUMENTS

| CN | 203480849 U |   | 3/2014 |   |
| CN | 204717194 U |   | 10/2015 |   |
| CN | 108506548 A | * | 9/2018 | ........... F16K 27/102 |
| CN | 108692081 A |   | 10/2018 |   |
| CN | 208281571 U |   | 12/2018 |   |
| CN | 210266036 U |   | 4/2020 |   |
| CN | 211059418 U |   | 7/2020 |   |
| CN | 111623126 A |   | 9/2020 |   |
| CN | 213420013 U |   | 6/2021 |   |

(Continued)

OTHER PUBLICATIONS

Machine English translation of CN208281571 (Year: 2024).*

(Continued)

*Primary Examiner* — Hailey K. Do

(57) ABSTRACT

A one-way valve is provided. The one-way valve includes a housing and a valve core assembly. The housing is provided with a valve port. A ratio of a wall thickness of the housing to an outer diameter of the housing is in a range of 0.08 and 0.12. The valve core assembly is movably disposed in the housing and configured to open or seal the valve port.

19 Claims, 7 Drawing Sheets

(56) References Cited

FOREIGN PATENT DOCUMENTS

| CN | 213420014 U | 6/2021 | | |
|---|---|---|---|---|
| CN | 214036997 U | 8/2021 | | |
| WO | WO-2014174954 A1 | * | 10/2014 | ........... F16K 27/029 |

OTHER PUBLICATIONS

Machine English translation of CN108692081 (Year: 2024).*
Machine English translation of CN108506548 (Year: 2024).*
Machine English translation of WO2014/174954 (Year: 2024).*
European search report of EP21882038.9.
International Search Report of PCT/CN2021/124923.
Notice of Reasons for Refusal of JP2023511989—Mar. 29, 2024.

* cited by examiner

ONE-WAY VALVE

CROSS-REFERENCE TO RELATED APPLICATIONS

This application is a continuation of international patent application No. PCT/CN2021/124923, filed on Oct. 20, 2021 and titled "ONE-WAY VALVE", which itself claims priority to Chinese patent application No. 202022365163.3, filed on Oct. 21, 2020, titled "ONE-WAY VALVE", Chinese patent application No. 202022365716.5, filed on Oct. 21, 2020, titled "ONE-WAY VALVE", and Chinese patent application No. 202022365645.9, filed on Oct. 21, 2020, titled "ONE-WAY VALVE" in the China National Intellectual Property Administration, the contents of the above identified applications are hereby incorporated herein in their entireties by reference.

TECHNICAL FIELD

The present disclosure relates to the field of one-way valves, and in particular, to a one-way valve.

BACKGROUND

At present, a one-way valve includes a housing provided with a valve port and a valve core assembly. The valve core assembly is movably disposed in the housing and configured to open or seal the valve port, so as to open or close the one-way valve. The one-way valve is configured to achieve one-way flow of a medium.

In the related art, a wall thickness of the housing cannot meet a requirement of use, so that the one-way valve cannot meet a pressure resistance requirement and has insufficient pressure resistance level and insufficient safety margin because of the wall thickness.

SUMMARY

The present disclosure provides a one-way valve, which can solve a problem that the one-way valve cannot meet a pressure resistance requirement caused by a wall thickness of a housing which cannot meet a requirement of use in the related art.

A one-way valve includes a housing provided with a valve port and a valve core assembly. A ratio of a wall thickness of the housing to an outer diameter of the housing is in a range of 0.08 and 0.12. The valve core assembly is movably disposed in the housing and configured to open or seal the valve port.

In the one-way valve provided in the present disclosure, a ratio of a wall thickness of the housing to an outer diameter of the housing is in a range of 0.08 and 0.12, so that the wall thickness of the housing can meet the requirement of use. In this way, the one-way valve can meet the pressure resistance requirement, thus improving the pressure resistance level of the one-way valve, and ensuring sufficient safety margin.

In some embodiments, the wall thickness of the housing is in a range of 1.4 millimeters to 2 millimeters. In this way, the wall thickness of the housing can be ensured to meet the requirement of use, so that the one-way valve can meet the pressure resistance requirement.

In some embodiments, the housing includes a valve seat and a valve deck connected to each other, a wall thickness of the valve seat is in a range of 1.4 millimeters to 2 millimeters, and a wall thickness of the valve deck is in a range of 1.4 millimeters to 2 millimeters. In this way, both a strength of the valve seat and a strength of the valve deck can be ensured, so that the valve seat and the valve deck can both meet the requirement of use.

In some embodiments, the one-way valve further includes a connecting pipe, the connecting pipe is in communication with the housing, and a ratio of a wall thickness of the connecting pipe to an outer diameter of the connecting pipe is in a range of 0.07 to 0.21. since the thickness of the connecting pipe to the outer diameter of the connecting pipe is in a range of 0.07 to 0.21, a strength of the connecting pipe can be guaranteed. In this way, the connecting pipe can be ensured to meet the requirement of use, thus improving the pressure resistance level of the one-way valve.

In some embodiments, the outer diameter of the connecting pipe is smaller than or equal to 10 millimeters. In this way, the strength of the connecting pipe can be ensured to meet the requirement of use.

In some embodiments, the connecting pipe is made of red copper, and the wall thickness of the connecting pipe is in a range of 1 millimeter to 1.3 millimeters. In some embodiments, the connecting pipe is made of steel, and the thickness of the connecting pipe is in a range of 0.5 millimeters to 1 millimeter. The wall thickness of the connecting pipe is provided in the ranges disclosed above, so as to ensure strength of the connecting pipe. In this way, the connecting pipe can be ensured to meet the requirement of use, thus improving the pressure resistance level of the one-way valve.

In some embodiments, the one-way valve further includes a first step structure and a second step structure. The housing includes a valve deck and a valve seat connected to each other. The first step structure is located at an end of the valve seat towards the valve deck, the second step structure is located at an end of the valve deck towards the valve seat, and the first step structure is connected to the second step structure by inserting. The first step structure and the second step structure are capable of guiding the valve deck and the valve seat when assembling the valve deck and the valve seat, which can improve assembly efficiency.

In some embodiments, the first step structure includes a first inserting section and a first step surface, and the second step structure includes a second inserting section and a second step surface. A part of the first inserting section overlaps with the second inserting section, an inner wall of the first inserting section fits with an outer wall of the second inserting section, and the first inserting section abuts against the second step surface. In this way, a contact area between the valve deck and the valve seat can be increased, thus enhancing a welding strength.

In some embodiments, a ratio of a wall thickness of the first inserting section to the outer diameter of the housing is greater than or equal to 0.034. In this way, connection strength between the valve deck and the valve seat can be guaranteed, so that the wall thickness of the housing can be ensured to meet the requirement of use and the one-way valve can meet the pressure resistance requirement.

In some embodiments, the wall thickness of the first inserting section is greater than or equal to 0.6 millimeters. In this way, the connection strength between of the valve deck and the valve seat can be guaranteed.

In some embodiments, an end wall of the first inserting section is connected to the second step surface by welding, and a ratio of a weld joint depth between the end wall of the first inserting section and the second step surface to a wall thickness of the first inserting section is greater than or equal to 0.5. In this way, the connection strength between the valve deck and the valve seat can be guaranteed.

In some embodiments, the first step structure includes a first abutting section and a first step surface, the second step structure includes a second abutting section and a second step surface, and the first abutting section abuts against the second abutting section.

In some embodiments, the one-way valve includes a valve core seat, the housing is provided with a mounting hole, the valve core seat is separate from the housing, the valve core seat extends through the mounting hole, and the valve port is disposed on the valve core seat. The valve core seat includes a pressing section and a guiding section, an outer wall of the pressing section is in interference fit with an inner wall of the mounting hole, and an outer wall of the guiding section is in clearance fit with the inner wall of the mounting hole. In this way, by separating the valve core seat from the housing, the valve core seat can be processed separately, which can ensure processing accuracy of the valve core seat and further ensure the sealing performance of the valve core seat. In addition, coaxiality between the valve core seat and the housing can be ensured, so that the outer wall of the guiding section is in clearance fit with the inner wall of the mounting hole. A gap between the outer wall of the guiding section and the inner wall of the mounting hole can be taken as a solder filling gap, which is convenient for the solder to be filled between the guiding section and the mounting hole, thus achieving a firm connection between the valve core seat and the housing.

In some embodiments, the one-way valve further includes a limiting structure. The limiting structure is disposed between the valve core seat and the housing, and configured to limit an axial position of the valve core seat relative to the housing. Therefore, the valve core seat can be prevented from being over-pressed into the mounting hole.

In some embodiments, an outer diameter of the pressing section is greater than an outer diameter of the guiding section. The mounting hole includes a first hole section and a second hole section connected to each other and the first hole section and the second hole section are in communication with each other, and an inner diameter of the first hole section is greater than an inner diameter of the second hole section. The pressing section extends in the first hole section and is in interference fit with the first hole section, the outer wall of the guiding section is in clearance fit with an inner wall of the second hole section, and a bottom wall of the first hole section abuts against an end wall of the pressing section towards the guiding section to define the limiting structure. With the above structure, when the valve core seat is pressed into the mounting hole during assembly, the guiding section can match with the second hole section to guide the assembly. When the valve core seat moves and the end wall of the pressing section towards the guiding section and abuts against the bottom wall of the first hole section, the valve core seat can be positioned at a current position without additional limiting structure. At this time, the valve core seat can be assembled in place, and then the valve core seat can be fixed to the housing by welding. In a process of welding, the gap between the outer wall of the guiding section and an inner wall of the second hole section can be defined as a solder filling gap, which is convenient to fill the solder between the guiding section and the mounting hole, thus achieving a firm connection between the valve core seat and the housing.

In some embodiments, the valve core seat is provided with a sealing portion, and the valve core assembly includes a valve-opening position and a valve closing position corresponding to the valve port. When the valve core assembly is located at the valve-closing position, the valve core assembly hermetically abuts against the sealing portion. In this way, the sealing performance of the valve core seat can be strengthened, and no internal leakage will occur when the one-way valve is closed.

In some embodiments, the sealing portion is an annular-shaped protrusion and the annular-shaped protrusion is disposed at an outer circumference of the valve port along a circumference of the valve port. When the valve core assembly is located at the valve-closing position, the valve core assembly can contact the valve core seat via the annular-shaped protrusion, which facilitates a sealing connection between the valve core assembly to the valve core seat.

In some embodiments, an end wall of the annular-shaped protrusion towards the valve core assembly is a curved surface. In this way, the sealing performance can be strengthened.

In some embodiments, the one-way valve further includes a connecting pipe, the valve seat includes a mounting section extending out from the mounting hole, the mounting section is connected to the guiding section, and the connecting pipe is sleeved on the mounting section. With the structure described above, a contact area between the connecting pipe and the valve core seat can be increased, thus enhancing connection strength between the connecting pipe and the valve core seat, facilitating the connection of the connecting pipe and improving the assembly efficiency.

In some embodiments, the valve core seat, the connecting pipe and the housing are connected by welding. The connection by welding has advantages of easy assembly and firm connection.

In some embodiments, an inner diameter of the valve port gradually increases along a direction away from the housing. In this way, impact force of the medium entering from the valve port to the valve core assembly can be reduced, and the valve core assembly cannot wear easily, thereby ensuring a long service life of the valve core assembly.

In some embodiments, the housing is made of a stamping part by stretching. A forming process of stretching is simple, has a high processing efficiency and a low cost.

In some embodiments, the housing includes a valve seat and a valve deck connected with each other, and the one-way valve further includes a supporting flap. A joint of the valve seat and the valve deck is provided with a mounting groove. The supporting flap inserts in the mounting groove, the valve core assembly is connected to the supporting flap, and a groove width of the mounting groove is greater than or equal to a thickness of the supporting flap. In this way, the housing is easy to mount, and a mounting efficiency can be improved.

In some embodiments, a difference between the groove width of the mounting groove and the thickness of the supporting flap is in a range of 0 to 0.2 millimeters. In this way, it is easy to insert the supporting flap into the mounting groove and ensure stability of the supporting flap in the mounting groove.

In some embodiments, the one-way valve further includes a supporting flap. The housing includes a valve deck and a valve seat, and the valve core assembly is connected to the supporting flap. The supporting flap is disposed between the valve seat and the valve deck, and the valve seat is connected to the supporting flap by welding. In some embodiments, the valve deck is connected to the supporting flap by welding. In this way, firmness of the supporting flap can be improved to avoid shaking of the supporting flap in the housing.

In some embodiments, the mounting groove extends along a circumference of an inner wall of the housing. After assembling the supporting flap into the mounting groove, the supporting flap is able to provide uniform acting force to a valve core assembly, thereby ensuring effect of opening and closing the one-way valve.

In some embodiments, the housing includes a valve seat and a valve deck connected to each other, and an outer surface of the valve seat is parallel and level with an outer surface of the valve deck. After assembling the one-way valve to other components, since an outer surface of the one-way valve is flat, the one-way valve will not interfere with other components.

BRIEF DESCRIPTION OF THE DRAWINGS

The accompanying drawings, which constitute a part of this disclosure, are used to provide a further understanding of the present disclosure, and the schematic embodiments of the present disclosure and the description thereof are only used to interpret the present disclosure and are not intended to limit the present disclosure.

Figure 1:
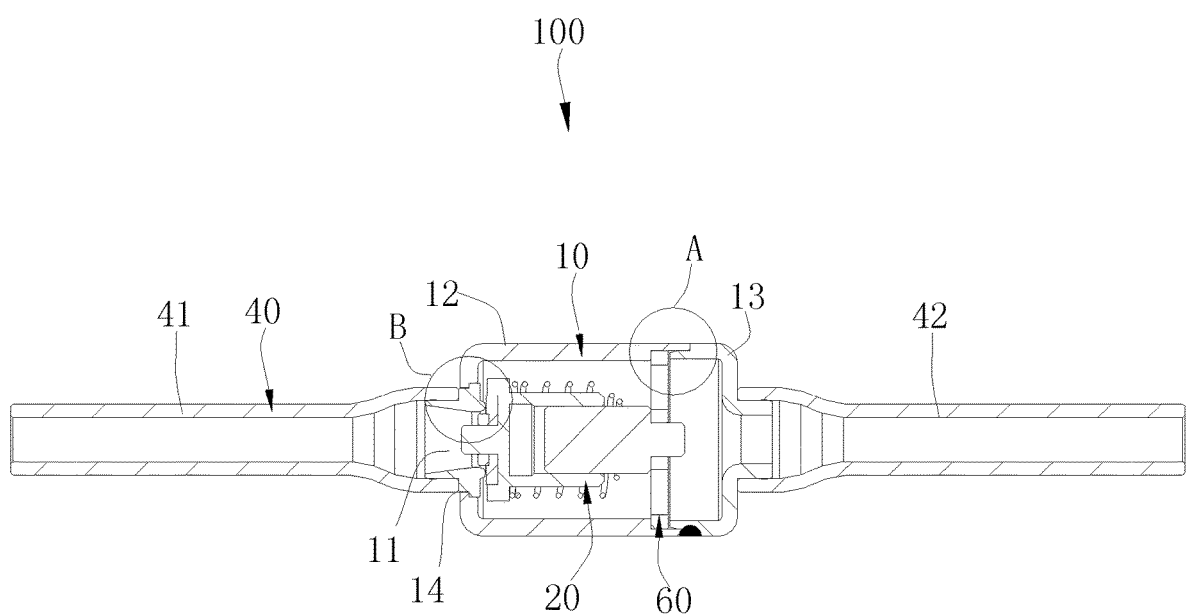
FIG. 1 is a structural schematic view of a one-way valve in a first embodiment of the present disclosure.

The above accompanying drawings include the following reference numerals, 100 represents a one-way valve, 10 represents a housing, 11 represents a valve port, 12 represents a valve seat, 13 represents a valve deck, 14 represents a mounting hole, 141 represents a first hole section, 142 represents a second hole section, 15 represents a mounting groove, 20 represents a valve core assembly, 30 represents a valve core seat, 31 represents a pressing section, 32 represents a guiding section, 33 represents a mounting section, 34 represents a sealing portion, 341 represents an annular-shaped protrusion, 40 represents a connecting pipe, 41 represents an inlet pipe, 42 represents an outlet pipe, 50 represents a limiting structure, 60 represents a supporting flap, 70 represents a first step structure, 71 represents a first inserting section, 72 represents a first step surface, 73 represents a first abutting section, 80 represents a second step structure, 81 represents a second inserting section, 82 represents a second step surface, and 83 represents a second abutting section.

DETAILED DESCRIPTION

The technical solutions in the embodiments of the present disclosure are clearly and completely described in the following with reference to the accompanying drawings in the embodiments of the present disclosure. It is obvious that the described embodiments are only a part of the embodiments, but not all of the embodiments. The following description of at least one exemplary embodiment is merely illustrative and not serves as any limitation on the present disclosure and its application or use. Based on the embodiments provided in the present disclosure, all other embodiments obtained by those of ordinary skill in the art without performing creative work fall within the scope of the present disclosure.

Figure 7:
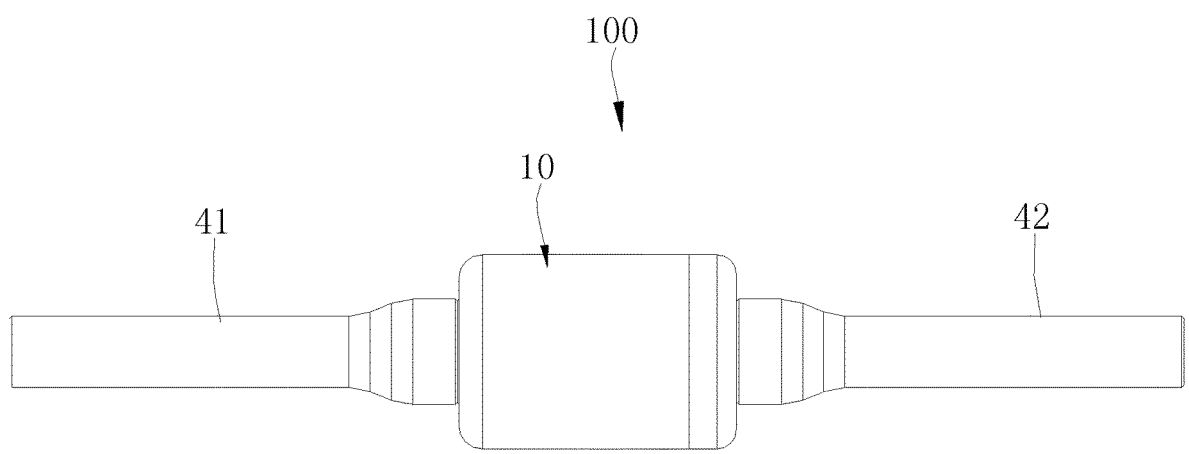
FIG. 7 is a structural schematic view of a one-way valve in an embodiment of the present disclosure.

Referring to FIG. 7, the present disclosure provides a one-way valve 100. The one-way valve 100 can be mounted in pipelines of a refrigeration system and configured to achieve one-way flow of a medium. It should be noted that the medium in the present disclosure refers a medium flowing into the one-way valve. When the one-way valve 100 is applied to a refrigeration system, the medium can be a refrigerant. The one-way valve 100 can also be applied in a water delivery pipeline system, in which the medium can be water.

Specifically, the one-way valve 100 includes a housing 10 and a valve core assembly 20. The housing 10 is provided with a valve port 11, and the valve core assembly 20 is movably disposed in the housing 10. The valve core assembly 20 is capable of opening or sealing the valve port 11, so as to open or close the one-way valve 100.

The housing 10 can be made of a stamping part by stretching, which has advantages of simple process, low cost and high processing efficiency.

A ratio of a wall thickness of the housing 10 to an outer diameter of the housing 10 is in a range of 0.08 and 0.12. Furthermore, the ratio of the wall thickness of the housing 10 to the outer diameter of the housing 10 can be 0.08, 0.09, 0.1, 0.11, 0.12, or any other value in the range of 0.08 to 0.12.

When applying the one-way valve 100 provided in the present disclosure, a ratio of a wall thickness of the housing 10 to an outer diameter of the housing 10 can be in a range of 0.08 and 0.12, so that the wall thickness of the housing 10 can be ensured to meet the requirement of use. The one-way valve 100 can meet the pressure resistance requirement, thus improving the pressure resistance level of the one-way valve, and ensuring sufficient safety margin. In this way, the one-way valve can be applied in a $CO_2$ systems to meet a high-pressure resistance requirement of the $CO_2$ systems.

It can be understood that when the ratio of the wall thickness of the housing 10 to the outer diameter of the housing 10 is less than 0.08, the wall thickness of the housing 10 is too small to meet the requirement of use. When the ratio of the wall thickness of the housing 10 to the outer diameter of the housing 10 is greater than 0.12, the wall thickness of the housing 10 is too thick, resulting in high cost of the one-way valve 100.

Furthermore, the wall thickness of the housing 10 can be in a range of 1.4 millimeters to 2 millimeters. In this way, the wall thickness of the housing 10 can be ensured to meet the requirement of use, so that the one-way valve 100 can meet the pressure resistance requirement. When the wall thickness of the housing 10 is less than 1.4 millimeters, the wall thickness of the housing 10 is too small to meet the requirement of use. When the wall thickness of the housing 10 is greater than 2 millimeters, the wall thickness of the housing 10 is too thick, resulting in high cost of the one-way valve 100. Furthermore, the wall thickness of the housing 10 can be 1.5 millimeters, 1.6 millimeters, 1.7 millimeters, 1.8 millimeters, 1.9 millimeters, or any other value in a range of 1.4 millimeters to 2 millimeters.

Referring to FIG. 1, the housing 10 can include a valve seat 12 and a valve deck 13 connected to each other, and the valve core assembly 20 can be disposed in the valve seat 12. A wall thickness of the valve seat 12 can be in a range of 1.4 millimeters to 2 millimeters, and a wall thickness of the valve deck 13 can be in a range of 1.4 millimeters to 2 millimeters. In this way, both strength of the valve seat 12 and strength of the valve deck 13 can guaranteed, so that the valve seat 12 and the valve deck 13 can both meet the requirement of use.

Both the valve seat 12 and the valve deck 13 can be made of a stamping part by stretching, and the valve seat 12 can be connected to the valve deck 13 by penetration welding.

An inner diameter of the valve port 11 can gradually increase along a direction away from the housing 10. In this way, impact force of the medium entering from the valve port 11 to the valve core assembly 20 can be reduced, and the valve core assembly 20 cannot be easily worn, thereby ensuring a long service life of the valve core assembly 20.

Figure 3:
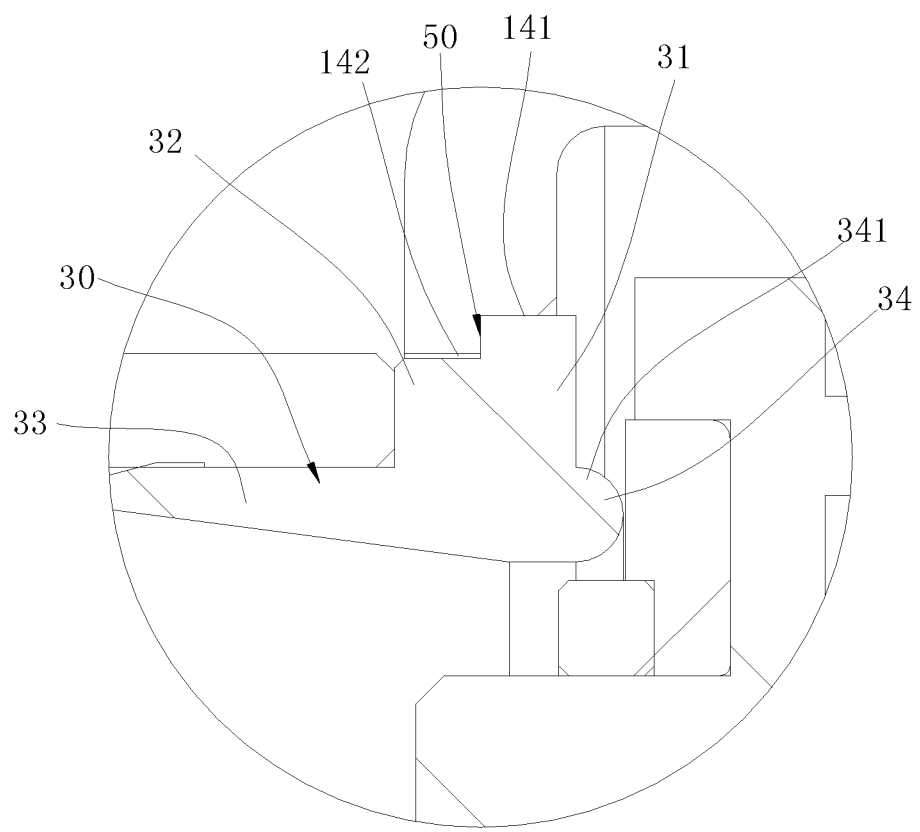
FIG. 3 is a partial enlargement view of portion "B" in FIG. 1.

Referring to FIG. 1 and FIG. 3, the one-way valve 100 can further include a valve core seat 30, the housing 10 can be provided with a mounting hole 14, the valve core seat 30 can extend through the mounting hole 14, and the valve port 11 can be disposed on the valve core seat 30.

The valve core seat 30 can be separate from the housing 10. By separating the valve core seat 30 from the housing 10, the valve core seat 30 can be processed separately, which can ensure processing accuracy of the valve core seat 30 and further ensure the sealing performance of the valve core seat 30.

Specifically, the valve core seat 30 can include a pressing section 31 and a guiding section 32 connected to each other. An outer wall of the pressing section 31 can be in interference fit with an inner wall of the mounting hole 14, and an outer wall of the guiding section 32 can be in clearance fit with the inner wall of the mounting hole 14. A gap between the outer wall of the guiding section 32 and the inner wall of the mounting hole 14 can be defined as a solder filling gap.

When the valve core seat 30 is pressed into the housing 10 during assembly, the valve core seat 30 can extend through the mounting hole 14 of the housing 10 first, during which the guiding section 32 can guide the valve core base 30, so that the outer wall of the pressing section 31 can be in interference fit with the inner wall of the mounting hole 14. In this way, coaxiality of the valve core seat 30 and the housing 10 can be guaranteed. Since the outer wall of the guiding section 32 can be in clearance fit with the inner wall of the mounting hole 14, the gap between the outer wall of the guiding section 32 and the inner wall of the mounting hole 14 can be defined as the solder filling gap, which is convenient to fill the solder between the guiding section 32 and the mounting hole 14, thus achieving a firm connection between the valve core seat 30 and the housing 10.

The valve core seat 30 can match with the mounting hole 14 in a plurality of manners.

In some embodiments, the inner wall of the mounting hole 14 can be cylinder-shaped, and an outer diameter of the pressing section 31 can be greater than an outer diameter of the guiding section 32. The outer wall of the pressing section 31 can be in interference fit with the inner wall of the mounting hole 14, and the outer wall of the guiding section 32 can be in clearance fit with the inner wall of the mounting hole 14.

In some embodiments, the mounting hole 14 can be a step-shaped hole, and the outer diameter of the pressing section 31 can be the same as the outer diameter of the guiding section 32. By adjusting a size of the step-shaped hole, the outer wall of the pressing section 31 can be in interference fit with the inner wall of the mounting hole 14, and the outer wall of the guiding section 32 can be in clearance fit with the inner wall of the mounting hole 14.

In some embodiments, the inner wall of the mounting hole 14 can be provided with a first step-shaped structure, and a junction between the pressing section 31 and the guiding section 32 can be defined as a second step-shaped structure. By adjusting sizes of the first step-shaped structure and the second step-shaped structure, the outer wall of the pressing section 31 can be in interference fit with the inner wall of the mounting hole 14, and the outer wall of the guiding section 32 can be in clearance fit with the inner wall of the mounting hole 14.

Specifically, in the present embodiment, the outer diameter of the pressing section 31 can be greater than the outer diameter of the guiding section 32. The mounting hole 14 can include a first hole section 141 and a second hole section 142 connected to and in communication with each other, and an inner diameter of the first hole section 141 can be greater than an inner diameter of the second hole section 142. The pressing section 31 can extend in the first hole section 141 and in interference fit with the first hole section 141, the outer wall of the guiding section 32 can be in clearance fit with an inner wall of the second hole section 142, and a bottom wall of the first hole section 141 can abut against an end wall of the pressing section 31 towards the guiding section 32.

With the above structure, when the valve core seat 30 is pressed into the mounting hole 14 during assembly, the guiding section 32 can match with the second hole section 142 to guide the assembly. When the valve core seat moves and the end wall of the pressing section 31 towards the guiding section 32 and abuts against the bottom wall of the first hole section 141, the valve core seat 30 can be positioned at a current position. At this time, the valve core seat 30 can be assembled in place, and finally the valve core seat 30 can be fixed to the housing 10 by welding. In the welding process, a gap between the outer wall of the guiding section 32 and an inner wall of the second hole section 142 can be defined as the solder filling gap, which is convenient to fill the solder between the guiding section 32 and the mounting hole 14, thus achieving a firm connection between the valve core seat 30 and the housing 10.

The valve core seat 30 can be provided with a sealing portion 34, and the valve core assembly 20 can include a valve-opening position and a valve closing position corresponding to the valve port 11. When the valve core assembly 20 is located at the valve-closing position, the valve core assembly 20 can hermetically abut against the sealing portion 34. By providing the sealing portion 34 on the valve core seat 30, the sealing performance between the valve core seat 30 and the valve core assembly 20 can be guaranteed.

The sealing portion 34 can be a sealing structure processed on the valve core seat 30, and can also be a seal member which is separately provided, such as a sealing ring.

In the present embodiment, the sealing portion 34 can be an annular-shaped protrusion 341, the annular-shaped protrusion 341 can be disposed at an outer circumference of the valve port 11 along a circumference of the valve port 11. When the valve core assembly 20 is located at the valve-closing position, the valve core assembly 20 can contact the valve core seat 30 via the annular-shaped protrusion 341, which facilitates a sealing connection between the valve core assembly 20 to the valve core seat 30. In addition, by separating the valve core seat 30 from the housing 10, the valve core seat 30 can be processed separately, which can ensure processing accuracy of the annular-shaped protrusion 341 on the valve core seat 30 and further ensure the sealing performance thereof.

Specifically, an end wall of the annular-shaped protrusion 341 towards the valve core assembly 20 can be a curved surface. In this way, when the valve core assembly 20 moves to the valve-closing position, the valve core assembly 20 can be firstly in contact with the curved surface of the annular-shaped protrusion 341, and the sealing effect of the one-way valve can be ensured with the annular-shaped protrusion 341 having a structure of curved surface.

The one-way valve can further include a connecting pipe 40, and the connecting pipe 40 can be connected to and in communication with the valve port 11. The valve seat 30 can include a mounting section 33 extending out from the mounting hole 14, the mounting section 33 can be connected to the guiding section 32, and the connecting pipe 40 can be sleeved on the mounting section 33. With the structure described, a contact area between the connecting pipe 40 and the valve core seat 30 can be increased, thus enhancing welding strength between the connecting pipe 40 and the valve core seat 30, facilitating the connection of the connecting pipe 40 and improving the assembly efficiency.

A ratio of a wall thickness of the connecting pipe 40 to an outer diameter of the connecting pipe 40 can be in a range of 0.07 to 0.21. Since the ratio of the wall thickness of the connecting pipe 40 to the outer diameter of the connecting pipe 40 is in a range of 0.07 to 0.21, strength of the connecting pipe 40 can be guaranteed. In this way, the connecting pipe 40 can be ensured to meet the requirement of use, thus improving the pressure resistance level of the one-way valve 100.

It can be understood that when the ratio of the wall thickness of the connecting pipe 40 to an outer diameter of the connecting pipe 40 is less than 0.07, the wall thickness of the connecting pipe 40 is too small to meet the requirement of use. When the ratio of the wall thickness of the connecting pipe 40 to an outer diameter of the connecting pipe 40 is greater than 0.21, the wall thickness of the connecting pipe 40 is too thick, resulting in high cost. Furthermore, the ratio of the wall thickness of the connecting pipe 40 to an outer diameter of the connecting pipe 40 can be 0.1, 0.15, 0.2, or any other value in the range of 0.07 to 0.21.

The outer diameter of the connecting pipe 40 can be smaller than or equal to 10 millimeters. In this way, strength of the connecting pipe 40 can be ensured to meet the requirement of use. Furthermore, the outer diameter of the connecting pipe 40 can be 1 millimeter, 2 millimeters, 3 millimeters, 4 millimeters, 5 millimeters, 6 millimeters, 7 millimeters, 8 millimeters, 9 millimeters, or any other value in the range of 0 to 10 millimeters.

The connecting pipe 40 can be made of red copper or steel.

When the connecting pipe 40 is made of the red copper, the wall thickness of the connecting pipe 40 can be in a range of 1 millimeter to 1.3 millimeters. When the connecting pipe 40 is made of steel, the thickness of the connecting pipe 40 can be in a range of 0.5 millimeters to 1 millimeter. The wall thickness of the connecting pipe 40 can be provided within the above range, so as to ensure strength of the connecting pipe 40. In this way, the connecting pipe 40 can be ensured to meet the requirement of use, thus improving the pressure resistance level of the one-way valve 100.

The connecting pipe 40 can include an inlet pipe 41 and an outlet pipe 42, and the inlet pipe 41 and the outlet pipe 42 can be provided at opposite ends of the housing 10, respectively. The inlet pipe 41 can be provided corresponding to the valve port 11 and connected to the valve core seat 30. The outlet pipe 42 can be connected to and in communication with the valve deck 13, and both the wall thicknesses of the inlet pipe 41 and outlet pipe 42 can be in the range described above.

Specifically, the valve core seat 30, the connecting pipe 40 and the housing 10 can be connected by brazing. In this way, the valve core seat 30, the connecting pipe 40 and the housing 10 can be synchronously fixed at the same time, thus simplifying assembly steps and facilitating assembly.

In the assembling process, a welding ring can be sleeved on the connecting pipe 40 and in contact with an outer wall of the housing 10. After the welding ring is melted, the solder can flow in the gap between the outer wall of the guiding section 32 and the inner wall of the mounting hole 14, and fixing the valve core seat 30, the connecting pipe 40 and the housing 10 after the solder is solidified.

The one-way valve can further include a limiting structure 50, the limiting structure 50 can be disposed between the valve core seat 30 and the housing 10, and configured to limit an axial position of the valve core seat 30 relative to the housing 10. Therefore, the valve core seat 30 can be prevented from being over-pressed into the mounting hole 14.

In the present embodiment, a bottom wall of the first hole section 141 can abut against an end wall of the pressing section 31 towards the guiding section 32 to define the limiting structure 50. In this way, the valve core seat 30 can be ensured to be perpendicular to the housing 10. In other embodiments, other structures such as additional protrusions matching with grooves may also be provided to define the limiting structure 50.

Figure 6:
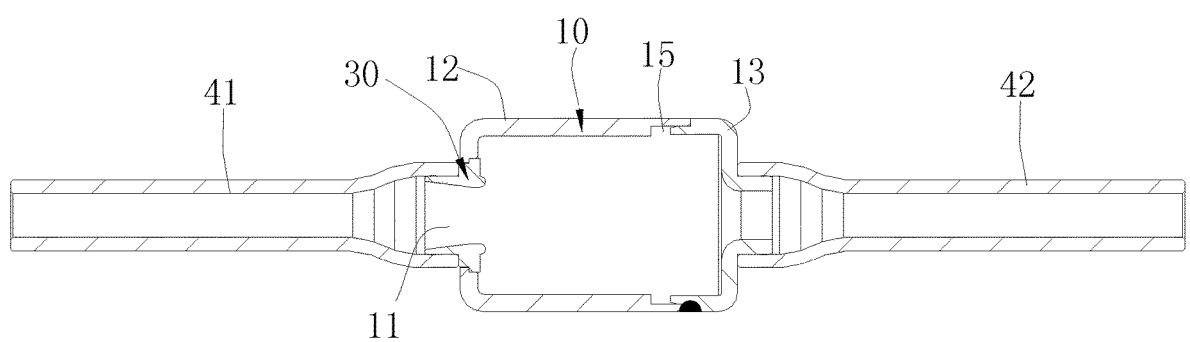
FIG. 6 is a structural schematic view of a one-way valve without a valve core assembly and a supporting flap in an embodiment of the present disclosure.

Referring to FIG. 1 and FIG. 6, the one-way valve 100 can further include a supporting flap 60. A joint of the valve seat 12 and the valve deck 13 can be provided with a mounting groove 15, and the supporting flap 60 can insert in the mounting groove 15. The valve core assembly 20 can be connected to the supporting flap 60, and an acting force can be applied by the supporting flap 60 to the valve core assembly 20, so as to reset the valve core assembly 20 to the valve-closing position to close the valve port 11. A groove width of the mounting groove 15 can be greater than or equal to a thickness of supporting flap 60.

In a process of assembling the supporting flap 60, the supporting flap 60 can be firstly inserted into the mounting groove 15, and then the valve seat 12 and valve deck 13 can be connected to each other. The mounting groove 15 at the joint of the valve seat 12 and valve deck 13 can accommodate the supporting flap 60 to simultaneously fix the supporting flap 60, which has an advantage of easy assembly and can improve the assembly efficiency. Moreover, the groove width of the mounting groove 15 can be greater than or equal to a thickness of supporting flap 60, so that it is easy to insert the supporting flap 60 into the groove 15.

A difference between the groove width of the mounting groove 15 and the thickness of the supporting flap 60 can be in a range of 0 to 0.2 millimeters. In this way, it is easy to insert the supporting flap 60 into the mounting groove 15 and ensures stability of the supporting flap 60 in the mounting groove 15.

It is understood that when the difference between the groove width of the mounting groove 15 and the thickness of the supporting flap 60 is less than 0, it is difficult to insert the supporting flap 60 into the mounting groove 15. When the difference between the groove width of the mounting groove 15 and the thickness of the supporting flap 60 is greater than 0.2 millimeters, a gap between the supporting flap 60 and the mounting groove 15 is too large, and the supporting flap 60 is easy to shake. Therefore, and it is difficult to firmly mount the supporting flap 60 in the mounting groove 15, so that effect of the opening and closing the one-way valve cannot be guaranteed.

The mounting groove 15 can extend along a circumference of an inner wall of the housing 10. After assembling the supporting flap 60 into the mounting groove 15, the supporting flap 60 can provide a uniform acting force to the valve core assembly 20, thereby guaranteeing effect of opening and closing the one-way valve.

Specifically, an axis of the mounting groove 15 can be perpendicular to that of the housing 10.

The one-way valve 100 can further include a first step structure 70 and a second step structure 80. The first step structure 70 can be located at an end of the valve seat 12 towards the valve deck 13, the second step structure 80 can be located at an end of the valve deck 13 towards the valve seat 12, and the first step structure 70 can be connected to the second step structure 80 by inserting. In a process of assembling the valve deck 13 and the valve seat 12, the first step structure 70 and the second step structure 80 are capable of guiding assembly of the valve deck 13 and the valve seat 12, which can improve assembly efficiency.

The mounting groove 15 can be provided between the first step structure 70 and the second step structure 80. A size of the mounting groove 15 can be controlled by adjusting a size of the first step structure 70 and a size of the second step structure 80.

The first step structure 70 can match with the second step structure 80 to define the mounting groove 15. The valve seat 12 and the valve deck 13 can be connected to each other while synchronously fixing the supporting flap 60, thereby facilitating assembly.

First Embodiment

Figure 2:
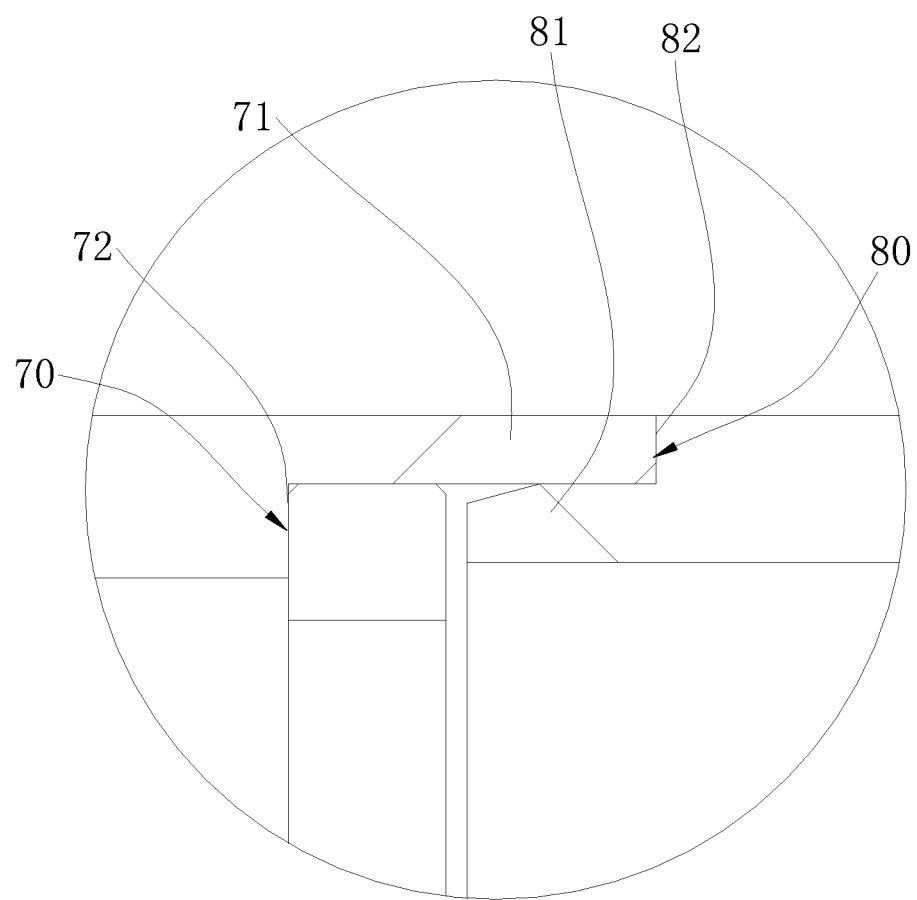
FIG. 2 is a partial enlargement view of portion "A" in FIG. 1.

Referring to FIG. 1 and FIG. 2, the first step structure 70 can include a first inserting section 71 and a first step surface 72, and the second step structure 80 can include a second inserting section 81 and a second step surface 82. An inner wall of the first inserting section 71 can fit with an outer wall of the second inserting section 81.

A ratio of a wall thickness of the first inserting section 71 and the outer diameter of the housing 10 can be greater than or equal to 0.034. In this way, a connection strength between of the valve deck 13 and the valve seat 12 can be guaranteed, so that the wall thickness of the housing 10 can be ensured to meet the requirement of use and the one-way valve 100 can meet the pressure resistance requirement.

A gap between the end surface of the second inserting section 81 and the first step surface 72 can be defined as a mounting groove 15. A part of the first inserting section 71 can overlap with the second inserting section 81, thus facilitating connection of the valve seat 12 and the valve deck 13. The groove width of the mounting groove 15 can be controlled by adjusting spacing between the end surface of the second inserting section 81 and the first step surface 72. A part of the first inserting section 71 can be disposed outside the second inserting section 81.

The first inserting section 71 can be connected to the second step surface 82 by welding, so that the valve seat 12 and the valve deck 13 can be connected to each other and the supporting flap 60 can be fixed. Moreover, the connection by welding has the advantages of easy to assemble and firm in connection. A solder joint in a partial enlargement view of portion "A" of FIG. 1 is not shown, and reference may be made to the solder joint on the other side corresponding to the partial enlargement view of portion "A" on the housing 10 in FIG. 1.

The wall thickness of the first inserting section 71 can be greater than or equal to 0.6 millimeters. In this way, the connection strength between the valve deck 13 and the valve seat 12 can be guaranteed, so that the wall thickness of the housing 10 can be ensured to meet the requirement of use In the present embodiment, a ratio of a weld joint depth between the end wall of the first inserting section 71 and the second step surface 82 to a wall thickness of the first inserting section 71 can be greater than or equal to 0.5. With the weld joint depth in the range described above, the connection strength the valve deck 13 and the valve seat 12 can guaranteed, thereby increasing compressive strength of the one-way valve 100. It should be noted that the weld joint depth between the end wall of the first inserting section 71 and the second step surface 82 refers to a depth of the solder flowing into the gap between the end wall of the first inserting section 71 and the second step surface 82 from the outer side wall of the housing 10.

Second Embodiment

Figure 4:
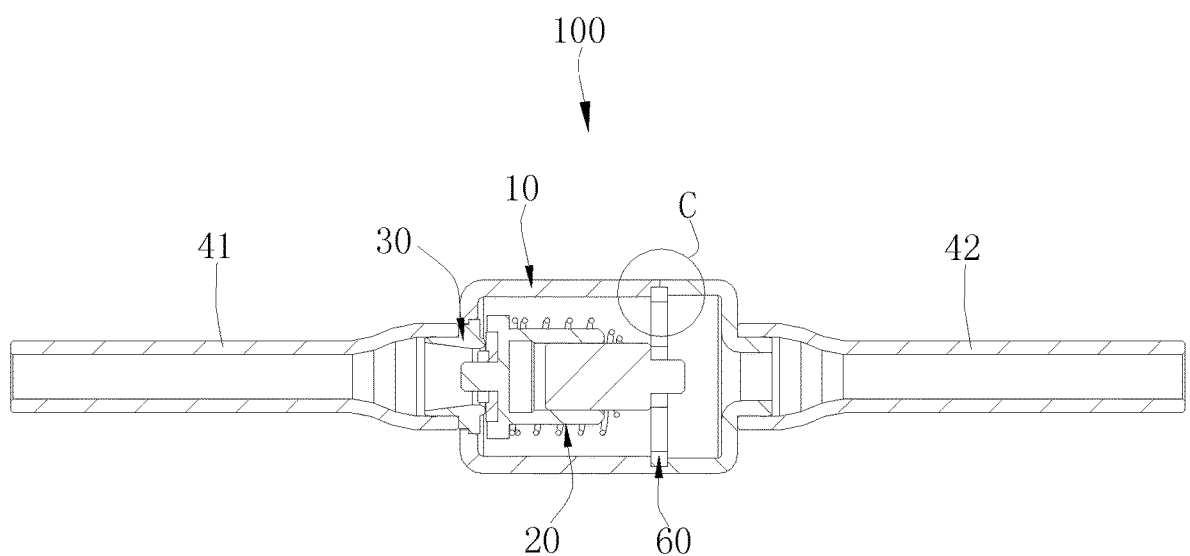
FIG. 4 is a structural schematic view of a one-way valve in a second embodiment of the present disclosure.
Figure 5:
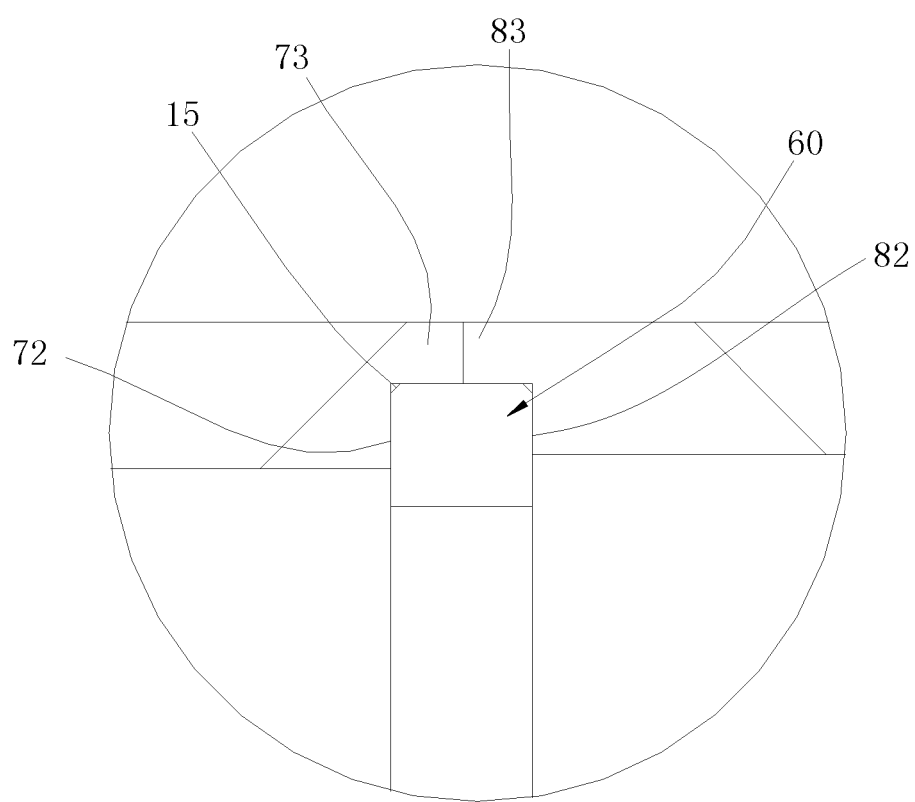
FIG. 5 is a partial enlargement view of portion "C" in FIG. 4.

Referring to FIG. 4 and FIG. 5, differences between the second embodiment and the first embodiment are described hereinafter. In the second embodiment, the first step structure 70 can include a first abutting section 73 and a first step surface 72, and the second step structure 80 can include a second abutting section 83 and a second step surface 82. The first abutting section 73 can abut against the second abutting section 83, and the first step surface 72, the first abutting section 73, and the second abutting section 83 and the second step surface 82 can be surrounded to define a mounting groove 15. With the structure described above, the one-way valve also has the advantages of being easy to assemble the supporting flap 60 and high assembly efficiency in the first embodiment.

The first abutting section 73, the second abutting section 83 and the supporting flap 60 can be connected to each other by welding. By simultaneously welding the supporting flap 60 with the valve seat 12 and the valve deck 13, the supporting flap 60 can be fixed more firmly, and the supporting flap 60 can be prevented from shaking in the housing 10.

The first abutting section 73, the second abutting section 83 and the supporting flap 60 can be connected to each other by penetration welding.

In the present disclosure, the ratio of the wall thickness of the housing 10 to the outer diameter of the housing 10 can be in a range of 0.08 and 0.12, so that the one-way valve 100 can meet a higher pressure resistance requirement and be applied in a field requires high pressure resistance. The housing 10 can be made of the stamping part by stretching, which has advantages of simple process and low cost. The width of the mounting groove 15 can be greater than the thickness of the supporting flap 60, which facilitates the mounting of the supporting flap 60. By separating the valve core seat 30 from the housing 10, the valve core seat 30 can be processed separately, which can ensure processing accuracy of the valve core seat 30 and reduce internal leakage. The pressing section 31 can be in interference fit with the mounting hole 14, so that coaxiality of the valve core seat 30 and the housing 10 can be ensured. The gap between the outer wall of the guiding section 32 and an inner wall of the second hole section 142 can be defined as the solder filling gap, thereby ensuring a firm connection between the valve core seat 30 and the housing 10.

What is claimed is:

1. A one-way valve, comprising
a housing provided with a valve port, wherein a ratio of a wall thickness of the housing to an outer diameter of the housing is in a range of 0.08 and 0.12; and,
a valve core assembly, wherein the valve core assembly is movably disposed in the housing and configured to open or seal the valve port,
wherein the housing comprises a valve seat and a valve deck connected with each other, and the one-way valve further comprises a supporting flap;
a joint of the valve seat and the valve deck is provided with a mounting groove; and
the supporting flap inserts in the mounting groove, the valve core assembly is connected to the supporting flap, and a groove width of the mounting groove is greater than or equal to a thickness of the supporting flap.

2. The one-way valve of claim 1, wherein the wall thickness of the housing is in a range of 1.4 millimeters to 2 millimeters.

3. The one-way valve of claim 1, wherein the housing comprises a valve seat and a valve deck connected to each other, a wall thickness of the valve seat is in a range of 1.4 millimeters to 2 millimeters, and a wall thickness of the valve deck is in a range of 1.4 millimeters to 2 millimeters.

4. The one-way valve of claim 1, further comprising a connecting pipe, wherein the connecting pipe is in communication with the housing, and a ratio of a wall thickness of the connecting pipe to an outer diameter of the connecting pipe is in a range of 0.07 to 0.21;and/or,
the one way valve further comprises a connecting pipe, the connecting pipe is in communication with the housing, the outer diameter of the connecting pipe is smaller than or equal to 10 millimeters; and/or,
the one way valve further comprises a connecting pipe, the connecting pipe is in communication with the housing, the connecting pipe is made of red copper, and the wall thickness of the connecting pipe is in a range of 1 millimeter to 1.3 millimeters; or, the connecting pipe is made of steel, and the thickness of the connecting pipe is in a range of 0.5 millimeters to 1 millimeter.

5. The one-way valve of claim 1, wherein an inner diameter of the valve port increases along a direction away from the housing.

6. The one-way valve of claim 1, wherein the housing is made of a stamping part by stretching; and/or,
the housing comprises a valve seat and a valve deck connected to each other, and an outer surface of the valve seat is parallel and level with an outer surface of the valve deck.

7. The one-way valve of claim 1, wherein a difference between the groove width of the mounting groove and the thickness of the supporting flap is in a range of 0 to 0.2 millimeters.

8. The one-way valve of claim 1, wherein the supporting flap is disposed between the valve seat and the valve deck, the valve seat is connected to the supporting flap by welding, and/or, the valve deck is connected to the supporting flap by welding.

9. The one-way valve of claim 1, wherein the mounting groove extends along a circumference of an inner wall of the housing.

10. The one-way valve of claim 1, comprising a valve core seat, wherein the housing is provided with a mounting hole, the valve core seat is separate from the housing, the valve core seat extends through the mounting hole, and the valve port is disposed on the valve core seat; and
the valve core seat comprises a pressing section and a guiding section, wherein an outer wall of the pressing section is in interference fit with an inner wall of the mounting hole, and an outer wall of the guiding section is in clearance fit with the inner wall of the mounting hole.

11. The one-way valve of claim 10, further comprising a limiting structure, wherein the limiting structure is disposed between the valve core seat and the housing, and configured to limit an axial position of the valve core seat relative to the housing; and/or,
an outer diameter of the pressing section is greater than an outer diameter of the guiding section, the mounting hole comprises a first hole section and a second hole section connected to each other and the first hole section and the second hole section are in communication with each other, an inner diameter of the first hole section is greater than an inner diameter of the second hole section, the pressing section extends in the first hole section and is in interference fit with the first hole section, the outer wall of the guiding section is in clearance fit with an inner wall of the second hole section, and a bottom wall of the first hole section abuts against an end wall of the pressing section towards the guiding section to define the limiting structure.

12. The one-way valve of claim 10, wherein the valve core seat is provided with a sealing portion, the valve core assembly comprises a valve-opening position and a valve closing position corresponding to the valve port, and when the valve core assembly is located at the valve-closing position, the valve core assembly hermetically abuts against the sealing portion; and/or,
the valve core seat is provided with a sealing portion, the sealing portion is an annular-shaped protrusion and the annular-shaped protrusion is disposed at an outer circumference of the valve port along a circumference of the valve port; and/or,
the valve core seat is provided with a sealing portion, the sealing portion is an annular-shaped protrusion, an end wall of the annular-shaped protrusion towards the valve core assembly is a curved surface.

13. The one-way valve of claim 10, further comprising a connecting pipe, wherein the valve seat comprises a mounting section extending out from the mounting hole, the mounting section is connected to the guiding section, and the connecting pipe is sleeved on the mounting section; and/or,
the one-way valve further comprises a connecting pipe, the valve core seat, the connecting pipe and the housing are connected by welding.

14. The one-way valve of claim 1, further comprising a first step structure and a second step structure, wherein the housing comprises a valve deck and a valve seat connected to each other, the first step structure is located at an end of the valve seat towards the valve deck, the second step structure is located at an end of the valve deck towards the valve seat, and the first step structure is connected to the second step structure by inserting.

15. The one-way valve of claim 14, wherein the first step structure comprises a first abutting section and a first step surface, the second step structure comprises a second abutting section and a second step surface, and the first abutting section abuts against the second abutting section.

16. The one-way valve of claim 14, wherein the first step structure comprises a first inserting section and a first step surface, the second step structure comprises a second inserting section and a second step surface, a part of the first inserting section overlaps with the second inserting section, an inner wall of the first inserting section fits with an outer wall of the second inserting section, and the first inserting section abuts against the second step surface.

17. The one-way valve of claim 16, wherein a ratio of a wall thickness of the first inserting section and the outer diameter of the housing is greater than or equal to 0.034.

18. The one-way valve of claim 16, wherein the wall thickness of the first inserting section is greater than or equal to 0.6 millimeters.

19. The one-way valve of claim 16, wherein an end wall of the first inserting section is connected to the second step surface by welding, and a ratio of a weld joint depth between the end wall of the first inserting section and the second step surface to a wall thickness of the first inserting section is greater than or equal to 0.5.

* * * * *